United States Patent [19]

Ray

[11] Patent Number: 5,651,647
[45] Date of Patent: Jul. 29, 1997

[54] AUXILIARY CHUCK AND SCREWDRIVER FOR ELECTRIC DRILLS

[75] Inventor: Bennie Joe Ray, Arden, N.C.

[73] Assignee: GBR Pilot Master, Inc., Fort Mill, S.C.

[21] Appl. No.: 542,511

[22] Filed: Oct. 11, 1995

[51] Int. Cl.⁶ ..................................... B23B 51/08
[52] U.S. Cl. ........................ 408/239 R; 7/158; 7/165; 81/439; 279/14; 279/145; 408/239 A
[58] Field of Search ............... 7/158, 165; 408/1 R, 408/226, 238, 239 R, 239 A, 241 R; 279/14, 145; 81/439

[56] References Cited

U.S. PATENT DOCUMENTS

| | | | |
|---|---|---|---|
| 3,484,114 | 12/1969 | Rodin | 408/241 R |
| 3,932,904 | 1/1976 | Nilsson et al. | 7/158 |
| 3,973,784 | 8/1976 | Smith | 408/239 A |
| 4,796,319 | 1/1989 | Taft | 7/165 |
| 5,110,145 | 5/1992 | Stewart | 408/239 A |
| 5,129,118 | 7/1992 | Walmesley | 7/165 |
| 5,191,666 | 3/1993 | Corbin | 7/165 |
| 5,230,261 | 7/1993 | Akazawa et al. | 81/439 |

FOREIGN PATENT DOCUMENTS 2822372  11/1979  Germany .................. 7/158

*Primary Examiner*—Daniel W. Howell
*Attorney, Agent, or Firm*—Clifton Ted Hunt

[57] ABSTRACT

The combination tool of this invention positions a screwdriver in the chuck of an electric drill and frictionally fastens an auxiliary chuck to the portion of the screwdriver extending from the electric drill. A drill bit is placed in the auxiliary chuck and a pilot hole is drilled. The auxiliary chuck is then pulled off of the screwdriver and the exposed screwdriver is used to thread a screw in the pilot hole. The auxiliary chuck with its drill bit may then be pushed back on the screwdriver to drill another pilot hole, and the process repeated as desired.

1 Claim, 1 Drawing Sheet

AUXILIARY CHUCK AND SCREWDRIVER FOR ELECTRIC DRILLS

FIELD OF THE INVENTION

This invention relates to a combination tool adapted for use with an electric drill to both drill a pilot hole and then thread a screw into the pilot hole.

BACKGROUND OF THE INVENTION

It is conventional practice in attaching an article to a supporting surface, such as, for example, attaching a bracket to a wall, to first drill a pilot hole in the supporting surface and then pass a screw through the article to be attached and thread the screw into the pilot hole.

Several steps are required to accomplish this when using a conventional electric drill to power a conventional drill bit and a conventional screwdriver. First, the right size drill bit must be selected and mounted in the chuck of the electric drill. Then the electric drill must be activated to drill the pilot hole in the supporting surface. The electric drill is then deactivated and the drill bit is removed and replaced by a screwdriver in the chuck of the electric drill. Finally, the electric drill is reactivated to fasten the article to the supporting surface by passing a screw through the article and threading the screw into the pilot hole.

The desirability of combining a drill, for making pilot holes, with a screwdriver, for putting screws in the pilot holes, has been long recognized. Applicant is aware of the following patents which disclose apparatus for accomplishing this purpose:

| U.S. Pat. No. | Issue Date | Inventor | Title |
|---|---|---|---|
| 274,042 | Mar 13, 1883 | Smith | CONVERTIBLE SCREW DRIVER AND BORER |
| 366,205 | July 12, 1887 | Cronk | COMBINED SCREW DRIVER AND BRAD AWL |
| 529,401 | Nov 20, 1894 | McCoy | SPIRAL SCREW DRIVER AND DRILL |
| 3,484,114 | Sep 12, 1967 | Rodin | SCREW INSTALLING ATTACHMENT FOR POWER TOOLS |
| 3,932,904 | Jan 20, 1976 | Nilsson | COMBINATION TOOL |
| 3,965,510 | Jun 29, 1976 | Ernst | COMBINATION DRILLING AND WRENCHING TOOL |
| 4,512,693 | Apr 23, 1985 | Swanson | REVERSIBLE DRILL AND DRIVER TOOL HOLDER |
| 4,796,319 | Jan 10, 1989 | Taft | COMBINATION SCREW-TAPPING AND SCREW-DRIVING TOOL |
| 5,129,118 | Jul 14, 1992 | Walmesley | ACCESSORY TOOL APPARATUS FOR USE ON POWER DRILLS |
| 5,191,666 | Mar 9, 1993 | Corbin | DRILL ADAPTER |

The patents to Rodin, Taft, Walmesley, and Corbin disclose combination tools for power tools (electric drills) wherein the chuck of the electric drill supports a drill bit and a screwdriver is supported in each instance by a sleeve that fits over the chuck of the electric drill.

The combination tools of Nilsson, Ernst, and Swanson each include a shank whose sole function is to be attached to the chuck of an electric drill to transmit torque from the electric drill to the combination tool. See the central stub axle 4 in Nillson; the mandrel 14 in Ernst; and the tang 19 in Swanson.

None of the combination tools used with electric drills in the prior art known to applicant have captured the simplicity and ease of operation that is found in the patents issued to Smith and Cronk more than one hundred years ago—before the invention of electric drills. Smith and Cronk put a hole "borer" or "brad awl" on one end of a strip of metal and a screwdriver on the other end of that strip. The strip of metal was held in a hollow handle with the desired end extending outwardly for use.

The apparatus invented by applicant carries the simplicity and ease of operation of Smith and Cronk forward for use with the convenience and labor saving advantages of electric drills.

SUMMARY OF THE INVENTION

The combination tool of this invention is a simple but novel combination of a double-headed screwdriver shaft and an auxiliary chuck of the type commonly used on electric drills. The auxiliary chuck is modified by a coupler that is formed integrally with, welded, or otherwise affixed to the inner end of the chuck for releasable engagement with the screwdriver shaft. A flat blade is at one end of the double-headed screwdriver shaft and a Phillips head is at the other end of the shaft. The connector can be releasably connected to either end portion of the screwdriver shaft.

In use, one end portion of the double-headed screwdriver shaft is mounted in the chuck of an electric drill and the selected end portion of the double-headed screwdriver shaft is releasably connected with the connector on the auxiliary chuck. A drill bit is mounted in the usual way in the auxiliary chuck and the electric drill is activated to form a pilot hole in the usual way. After the pilot hole is formed, the electric drill is deactivated and the auxiliary chuck is removed from the double-headed screwdriver shaft to expose the selected head of the screwdriver that conforms with the screw to be fastened in the pilot hole. The electric drill is then activated to thread the screw in the pilot hole in the usual way.

DETAILED DESCRIPTION OF THE INVENTION

Figure 1:
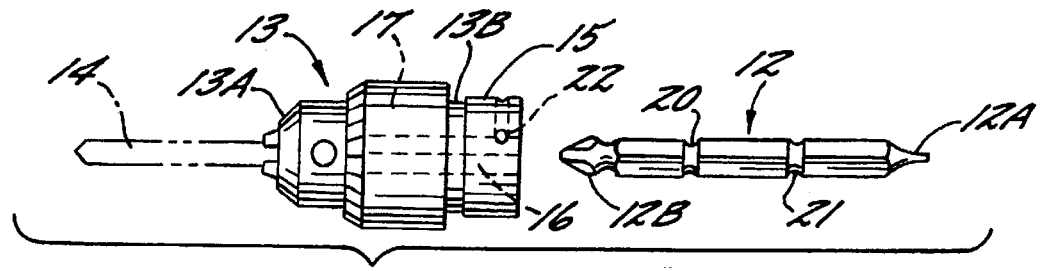
FIG. 1 is an exploded side view of the double-ended screwdriver shaft and the auxiliary chuck with a drill bit, shown in phantom lines, mounted for use in the auxiliary chuck.
Figure 2:
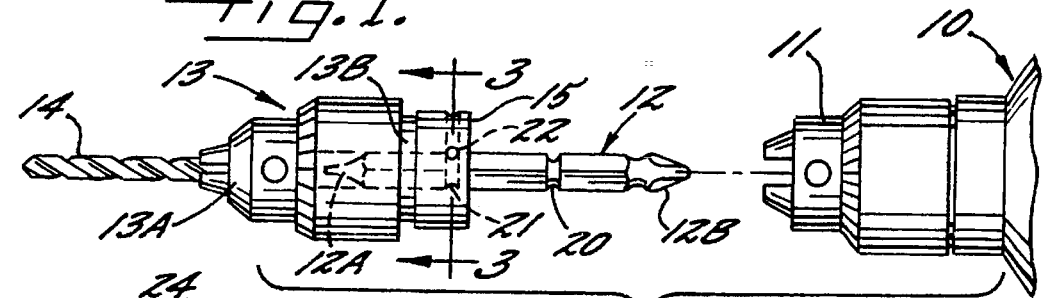
FIG. 2 is an exploded side view showing the auxiliary chuck mounted on the double-headed screwdriver shaft that is positioned for mounting in the chuck of a conventional electric drill.

Referring more specifically to the drawings, a fragmentary portion of an electric drill is broadly indicated at 10. The electric drill 10 includes the usual chuck 11 to hold a tool such as a drill bit or screwdriver. Here, in the present invention, the chuck 11 is used to hold a double-headed screwdriver shaft, broadly indicated at 12. One end of the screwdriver shaft 12 has a flat blade 12A to fit the slot in the head of a conventional screw. The other end of screwdriver shaft 12 is shaped as at 12B to fit the slot in the head of a Phillip's head screw.

The shaft 12 is shown in the drawings to be hexagonal, but it may be square, for the purpose of transmitting torque from the electric drill 10 to an auxiliary chuck 13, holding a selected drill bit 14 extending beyond the outer end 13A of the auxiliary chuck 13. A connector 15 is welded or otherwise fixed to the inner end 13B of the auxiliary chuck.

The connector 15 has an axial bore 16 extending therethrough and in communication with the hollow interior 17 of the auxiliary chuck 13. The bore 16 has the same cross sectional configuration as the screwdriver shaft 12 and slidably receives one end portion of the shaft 12 in use, as shown in the drawings.

Figure 3:
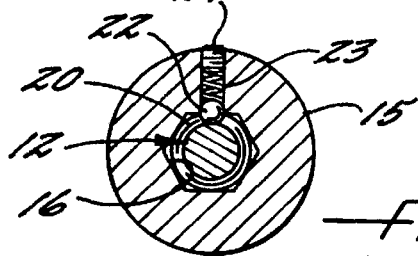
FIG. 3 is a sectional view taken substantially along the line 3—3 in FIG. 2.

The shaft 12 has a pair of retaining grooves 20 and 21 that are preferably equally spaced from the ends 12A and 12B of the shaft 12. When the screwdriver shaft 12 is operably seated in the connector 15 one of the retaining grooves 20 or 21 registers with a spring pressed ball 22 in a radial passage 23 in the connector 15 (FIG. 3). The spring and ball 22 are held in the passage 23 by a screw 24 threaded in the outer end of the passage 23.

In preparing to use the apparatus described, a drill bit is selected to make the desired size pilot hole and the drill bit, indicated at 14, is placed in the outer end 13A of the auxiliary chuck 13. Another preliminary step is to decide whether to use a screw with a slotted head or a screw with a Phillip's head. If a screw with a Phillip's head is to be threaded in the pilot hole to be drilled with the drill bit 14, the Phillip's head 12B is inserted in the coupler 15 to engage the groove 20 with the spring pressed ball 22. The assembly of the apparatus is completed by inserting the end 12A of the shaft 12 in the chuck 11 of the electric drill 10, as shown in FIG. 1.

Figure 4:
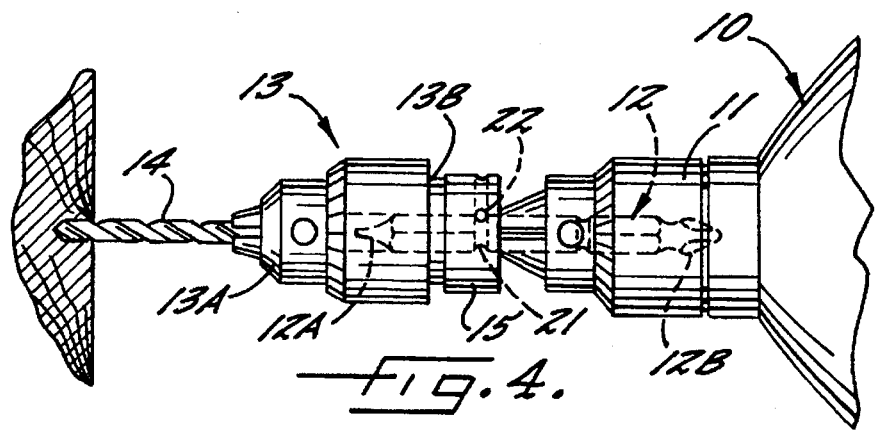
FIG. 4 is a side view showing the auxiliary chuck assembled on the conventional chuck of an electric drill for use in drilling a pilot hole.
Figure 5:
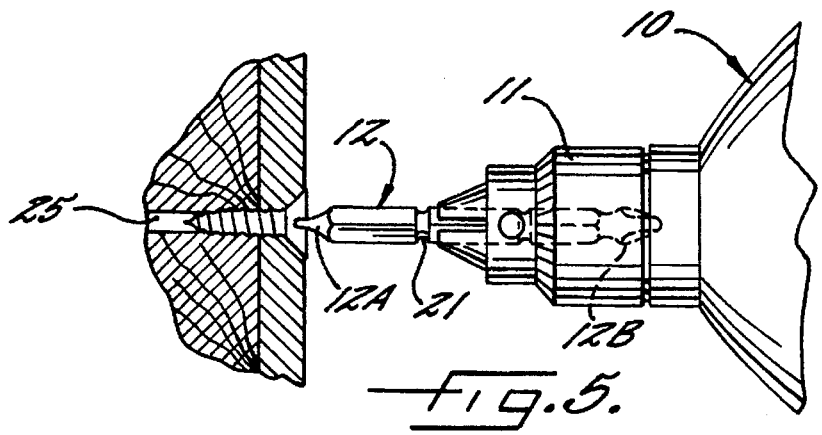
FIG. 5 is a side view showing a selected head of the screwdriver extending from the conventional chuck of the electric drill for threading a screw in the pilot hole after the auxiliary chuck and the drill bit have been removed from the screwdriver shaft.

If a screw with a straight slot is to be threaded in the pilot hole to be drilled with the drill bit 14, the flat blade 12A is inserted in the coupler 15 to engage the groove 21 with the spring pressed ball 22, and the Phillip's head 12B is positioned in the chuck 11 as shown in FIGS. 4 and 5. FIG. 4 shows the full assembly of the apparatus to drill a pilot hole, indicated at 25 in FIG. 5, with the drill bit 14. After the pilot hole 25 is drilled, the auxiliary chuck 13 is removed from the screwdriver shaft 12 by pulling the auxiliary chuck in the axial direction to overcome the pressure of the spring holding the ball 22 in the groove 21 in the screwdriver shaft 12. Removal of the auxiliary chuck 13 exposes the flat blade of the screwdriver that corresponds with the screw selected to be threaded in the pilot hole. The electric drill 10 may than be activated to attach a desired object 26 to a supporting surface 27 with a screw 28 threaded into the hole 25 by the screwdriver 12.

The auxiliary chuck 13 may be quickly and easily reassembled on the screwdriver shaft 12 to make another pilot hole, and just as easily removed to thread another screw, if desired.

There is thus provided an improved combination tool for making pilot holes and threading screws in them. The specific terms used in describing the invention have been used in a descriptive and generic sense only and not for the purpose of limitation.

I claim:

1. In an electric drill having a chuck, the combination of:
   (a) an auxiliary chuck, the auxiliary chuck including:
      (i) a connector having an axial bore and
      (ii) a drill bit extending from the auxiliary chuck;
   (b) an elongated double headed screwdriver shaft with a flat blade at one end and a Phillip's head configuration at the other end, either of which may be selected for use and the double headed screwdriver shaft having:
      (i) a pair of annular grooves equally spaced from opposite ends of the shaft;
   (c) a first portion of the screwdriver shaft containing the head that is not selected for use and its proximate annular groove adapted to be positioned in the chuck of the electric drill with the remaining portion of the screwdriver shaft containing the head that is selected for use and its proximate annular groove extending beyond the chuck for rotation when the electric drill is activated;
   (d) the connector in the auxiliary chuck adapted to be mounted on said remaining portion of the screwdriver shaft that extends beyond the chuck;
   (e) means causing the auxiliary chuck and the drill bit to rotate with the chuck on the electric drill when the electric drill is activated, and
   (f) means carried by the auxiliary chuck for operably engaging the annular groove on said remaining portion of the screwdriver shaft that extends beyond the chuck;
   whereby screws with different heads can be threaded in a pilot hole by positioning the first portion of the screwdriver shaft in the chuck of the electric drill with the remaining portion of the screwdriver shaft containing the head that is selected for use and its proximate annular groove extending beyond the chuck for rotation when the electric drill is activated, mounting the auxiliary chuck and the drill bit on said remaining portion of the screwdriver shaft, drilling the pilot hole while preventing axial movement of the auxiliary chuck relative to the chuck on the electric drill, removing the auxiliary chuck from the screwdriver shaft to expose the selected head, inserting a corresponding screw in the pilot hole, and threading it in place.

* * * * *